Jan. 22, 1963  W. MIKULAS  3,074,449
DEVICE FOR OPENING NUTS
Filed Jan. 9, 1961

INVENTOR
WILLIAM MIKULAS
BY Harry G. Shapiro
ATTORNEY

3,074,449
Patented Jan. 22, 1963

3,074,449
DEVICE FOR OPENING NUTS
William Mikulas, 298 Deems Ave., Staten Island, N.Y.
Filed Jan. 9, 1961, Ser. No. 81,342
2 Claims. (Cl. 146—13)

The present invention relates to devices for removing the shell from the meat of a fruit, and is more particularly directed to devices for opening the shells of nuts, such as pistachio nuts, which have shells which are cracked.

The shells of pistachio nuts are usually opened by cracking with the teeth or by hand. Neither procedure is satisfactory. In seeking to obtain access to the nut meat manually, one places his thumb nails in the crack between the shell halves to pry them apart. In addition to the stress placed upon the fingers, at times causing the nail to be split, it is difficult to prevent the nut meat from falling to the ground; the shell usually gives way suddenly and the meat may slip away before it can be grasped. Conventional nut crackers are unsuitable for they exert too great a crushing force, and often mutilate the relatively small nut kernel when the shell suddenly gives way.

A primary object of the invention is to provide a device which is particularly adapted to reliably remove the shells of nuts, such as pistachio nuts, so that the entire nut meat is available for eating.

Another object of the invention is to provide a shell opening device which is exceedingly easy to use, and which is so small and light that it may be contained in the same package as the package containing the pistachio nuts, or the like.

Another object of the invention is to provide a device which is so inexpensive to manufacture that without incurring undue cost, it may be given away as a premium with a suitably packaged quantity of pistachio nuts.

These, and other objects and advantages of the invention will be apparent from the following detailed description, taken in conjunction with the accompanying drawing, in which.

Figure 1:
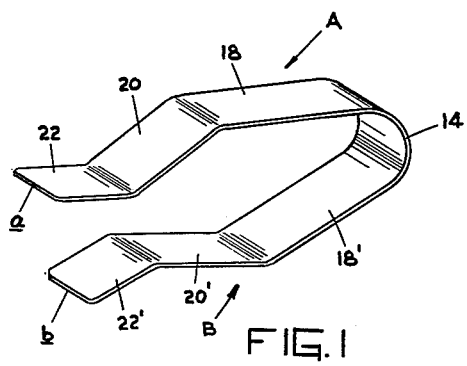
FIG. 1 is a perspective view, at approximately full scale, of a nut opening device made in accordance with a preferred form of the invention.

Referring to the drawing, the several illustrated forms of shell opening device constructed in accordance with the invention have in common a pair of arms A and B which terminate in thin tips $a$ and $b$, respectively. The arms are formed and connected to allow coincident engagement of the tips. Such coincident engagement is shown in FIG. 3, where the tips thus engaged provide the equivalent of a knife edge which is adapted to be inserted into the crack 10 in the shell of a nut N, such as a pistachio nut. The coincident engagement of the tips $a$ and $b$ is obtained by moving the substantially coextensive arms A and B together from the position shown, for example, in FIGS. 1 and 2 to the position shown in FIG. 3, or from the position shown in FIG. 5 to a position corresponding to FIG. 3 for such latter showing of the invention. At least one of the arms is provided rearwardly of its tip with a portion designated $c$ which projects toward the other arm. By further moving one arm toward the other, the projecting portion $c$ engages the other arm and causes one tip to swing away from the other about an arc having as its center the area where the projecting portion $c$ engages the other arm. As a result, and as shown in FIG. 4, the partially cracked shell halves 12 and 12' are pried apart to afford access to the whole nut meat.

Figure 2:
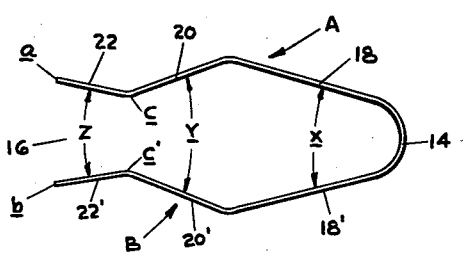
FIG. 2 is a side view showing the device of FIG. 1 in its normal or rest position.
Figure 3:
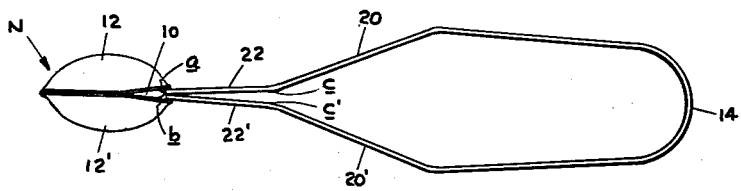
FIG. 3 is a side view, on a scale somewhat larger than that of FIGS. 1 and 2, showing the device operatively positioned in the crack of a nut's shell preparatory to removal of the shell.
Figure 4:
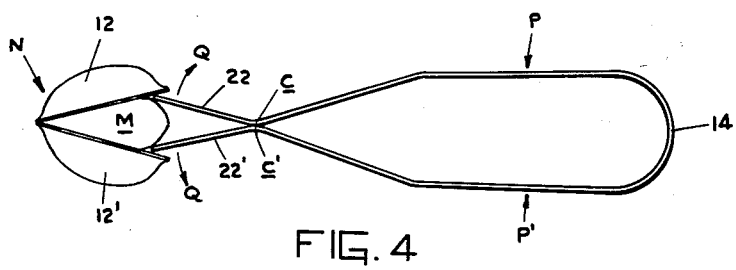
FIG. 4 illustrates the position of the device as it completely opens the shell to provide access to the nut meat.

In greater detail, reference is made to FIGS. 1 to 4 for a preferred embodiment of the invention. As illustrated, a thin strip of resilient material, preferably spring steel having a thickness of approximately 0.015 inch, or less, is bent upon itself to provide a generally U-shaped unitary member closed at one end 14 and open at the other end 16. The unitary member is preferably symmetrically formed to provide the coextensive, resiliently connected arms A and B of resilient material. In the position of rest as shown in FIGS. 1 and 2, the configuration of the device is such that each of the arms A and B is deformed or bent to provide a first pair of portions 18, 18' extending from the closed end 14 toward the open end 16. These portions of the arms may extend parallel to one another. It is preferred however, that they be divergently arranged as shown. The angle $x$ subtended between the portions 18 and 18' is preferably approximately 30 degrees. The arms A and B are formed to provide a second pair, or a pair of intermediate portions 20 and 20' which converge from the portions 18 and 18' toward the open end 16. While these portions may have any suitable angle of convergence, it is preferred that the angle $y$ subtended between them be approximately 40 degrees. A third pair of portions 22 and 22' diverge from the ends $c$ and $c'$ of the intermediate portions 20 and 20' toward the open end 16 of the generally U-shaped member and terminate in the tips $a$ and $b$. The angle $z$ between the arm portions 22 and 22' is preferably approximately 20 degrees.

When using the device, the portions 18 and 18' are grasped between the thumb and forefinger of one hand and pressed, thereby moving the arms from the rest position of FIGS. 1 and 2 to the shell-operative position shown in FIG. 3. The tips $a$ and $b$ engage and coincide with each other, and because of the thinness of the strip of spring steel, the tips provide a knife edge which may be inserted into the crack 10 of the nut, the nut being held in the other hand. With a strip of spring steel 0.015 inch in thickness, the combined thickness of the tips is only 0.030 inch, which readily permits insertion into the usual cracks in the shell. If desired, the tips may be sharpened, making the edge provided by engaged tips even thinner. As will be observed from FIG. 3, the geometry of the piece is such that though the arm portions 22 and 22' are divergent when in the rest position of FIG. 2, when the tips $a$ and $b$ are in engagement, the portions 22 and 22' immediately rearward of the tips, are spaced and convergently related in the direction toward the open or tip end of the device. The user now further presses the arm portions 18 and 18' together as shown by the arrows P and P' in FIG. 4. The arms being of resilient material and/or resiliently connected, the intersections of the intermediate portions 20 and 20' with the portions 22 and 22', or the projecting portions $c$ and $c'$, move toward toward and engage one another, and cause the tips $a$ and $b$ to move apart in the directions of the arrows Q and Q'. As a result, the shell halves 12 and 12' are pried apart permitting access to the whole nut meat M. Pushing the nut toward the device also permits the nut meant M to be grasped between the arm portions 22 and 22'. When the pressure upon the arm portions 18 and 18' is released, the arms A and B, due to the inherent resiliency of the piece, return to the position in FIGS. 1 and 2.

It will be apparent that the arm portions 20 and 22 of the arm A and the portions 20' and 22' of the arm B are in the nature of substantially V-shaped levers having the crests c and c', respectively, in alignment with and directed toward one another. The crest of one arm provides a fulcrum for the crest of the other arm so that when the crests are engaged and the levers turned or rotated about such crests, the tips a and b are swung apart on an arc about such area of engagement.

Figure 5:
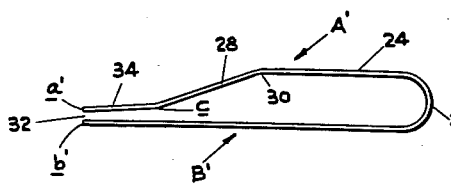
FIG. 5 is a side elevation of another embodiment of the invention.

While the above described structure is preferred, a shell opening device may be constructed as shown in FIG. 5. In this embodiment of the invention, a thin strip of resilient material is bent upon itself to provide a straight or unbent arm, the arm B', while the other arm A' is bent or deformed to provide, in the rest position thereof, a portion 24 extending from the generally U-shaped base portion 26 of the piece. The portion 24 may extend generally parallel to the arm B'. An intermediate arm portion 28 extends from the portion 24, there being a bend in the strip at 30 so that the portion 28 is convergingly related with respect to the portion 24 toward the open end 32 of the member. A third portion 34 of the arm A' terminates in the tips a' and b', this portion being bent at its intersection with the intermediate portion 28 to provide the projection or crest c. Where, as in this form of the invention, one of the arms of the device is made straight, the arm portion 34 is, like the arm portion 28, convergent with respect to the open end 32 of the device, the slope of the arm 34 being less steep than the slope of the arm 28.

The manner of operation of the device shown in FIG. 5 is essentially the same as hereinbefore described in connection with the device illustrated in FIGS. 1 through 4, there being however only one substantially V-shaped lever provided by the device.

It is believed that the various advantages of the shell opening device of the invention will be apparent from the foregoing description of several preferred embodiments thereof. Also, it will be apparent that various modifications and changes may be made. Although not as inexpensive to manufacture, the coextensive legs, for example, may be separately formed and riveted, or they may be otherwise joined together, rather than integrally connected in one piece, as preferred. These, and other changes will be apparent from he foregoing detailed description, such changes being contemplated within the spirit and scope of the invention as sought to be defined in the following claims.

I claim:

1. A shell opening device comprising a thin strip of resilient material bent on itself to provide a generally U-shaped unitary member closed at one end and open at the other end and having a pair of symmetrical, coextensive, resiliently connected arms, each of said arms being bent to provide in their rest position a first pair of portions diverging from said closed end toward said open end, a second pair of intermediate portions converging from said first pair of portions toward said open end, and a third pair of portions diverging from said intermediate portions toward said open end and terminating in tips adapted for coincident engagement with one another and insertion in the crack of a shell when said arms are moved toward one another from said rest position to shell operative position, the arms being engageable at the intersections of said intermediate and third portions to move the tips apart about an arc provided by such area of engagement.

2. A shell opening device as set forth in claim 1, wherein the angle between the first pair of portions is approximately 30 degrees, the angle between the intermediate portions is approximately 40 degrees, and the angle between the third pair of portions is approximately 20 degrees.

References Cited in the file of this patent
UNITED STATES PATENTS

| | | |
|---|---|---|
| 1,368,446 | Madsen | Feb. 15, 1921 |
| 1,622,309 | De Forest | Mar. 29, 1927 |
| 2,584,547 | Cahn | Feb. 5, 1952 |
| 2,634,728 | Dale | Apr. 14, 1953 |